(12) United States Patent
Hessling von Heimendahl

(10) Patent No.: US 9,919,810 B2
(45) Date of Patent: Mar. 20, 2018

(54) DYNAMIC AIRCRAFT HEADLIGHT AND METHOD OF OPERATING A DYNAMIC AIRCRAFT HEADLIGHT

(71) Applicant: Goodrich Lighting Systems GmbH, Lippstadt (DE)

(72) Inventor: Andre Hessling von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 50 days.

(21) Appl. No.: 14/851,957

(22) Filed: Sep. 11, 2015

(65) Prior Publication Data
US 2016/0076722 A1    Mar. 17, 2016

(30) Foreign Application Priority Data

Sep. 15, 2014    (EP) .................................. 14184792

(51) Int. Cl.
*B64D 47/02* (2006.01)
*B64D 47/04* (2006.01)
*F21W 101/06* (2006.01)
*B64D 47/06* (2006.01)
*F21W 111/06* (2006.01)
*F21Y 115/10* (2016.01)

(52) U.S. Cl.
CPC ............. *B64D 47/04* (2013.01); *B64D 47/02* (2013.01); *B64D 47/06* (2013.01); *F21W 2101/06* (2013.01); *F21W 2111/06* (2013.01); *F21Y 2115/10* (2016.08)

(58) Field of Classification Search
CPC ........ B64D 47/04; B64D 47/02; B64D 47/00; B64D 47/06; B64D 2203/00; F21W 2101/06; F21W 2111/06
See application file for complete search history.

(56) References Cited

U.S. PATENT DOCUMENTS

| 5,355,131 A * | 10/1994 | Metz et al. ............ B64D 47/04 362/470 |
| 2004/0263346 A1 | 12/2004 | Neal |
| 2011/0043120 A1 | 2/2011 | Panagotacos |
| 2011/0198997 A1 * | 8/2011 | Curtis .................... B64D 47/04 362/470 |

FOREIGN PATENT DOCUMENTS

EP        2574837 A2    4/2013

OTHER PUBLICATIONS

European Search Report for Application No. EP 14 184 792.1; dated Feb. 26, 2015, 6 pages.

* cited by examiner

Primary Examiner — Y M. Lee
(74) Attorney, Agent, or Firm — Cantor Colburn LLP

(57) ABSTRACT

A dynamic aircraft headlight, includes an LED group, having a plurality of LEDs, and an optical system, comprising at least one optical element, for shaping an output light intensity distribution from the light emitted by the LED group. The LED group and the optical system are stationary within the dynamic aircraft light unit, with each LED of the LED group has a set position with respect to the optical system and with a light output of each LED being affected differently by the optical system.

19 Claims, 6 Drawing Sheets

Fig. 2A
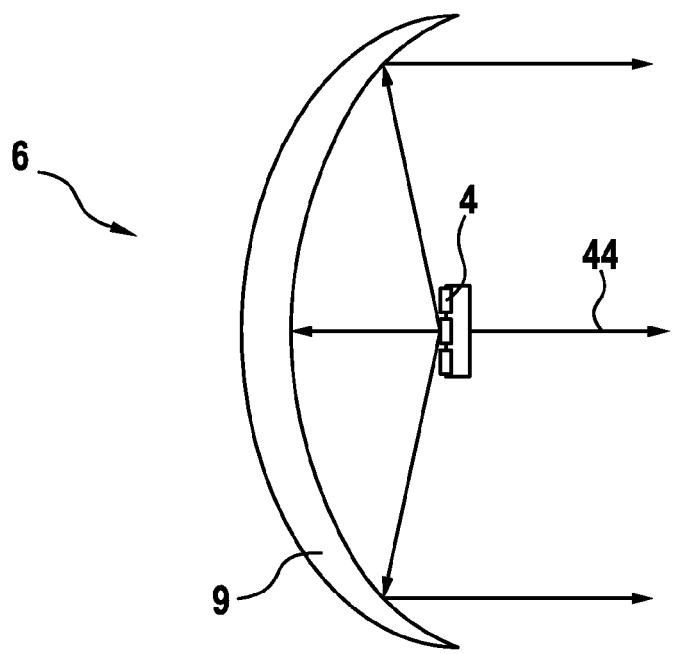
Fig. 2B
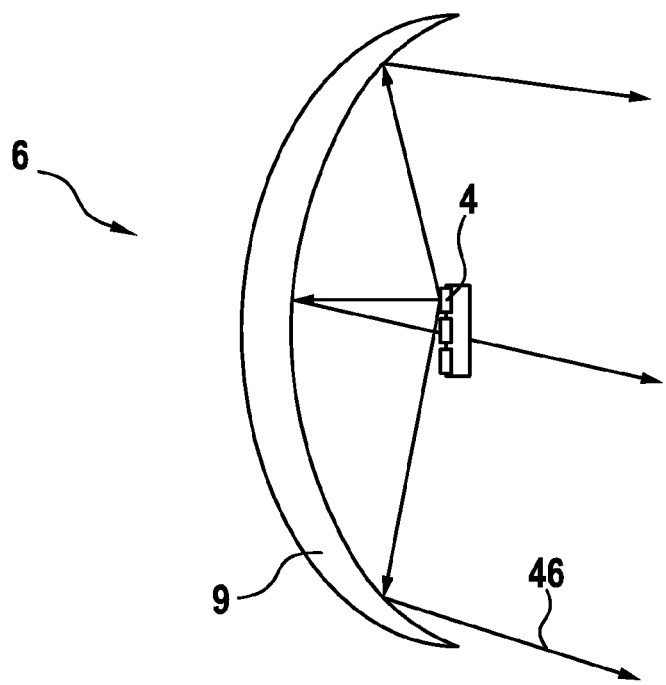

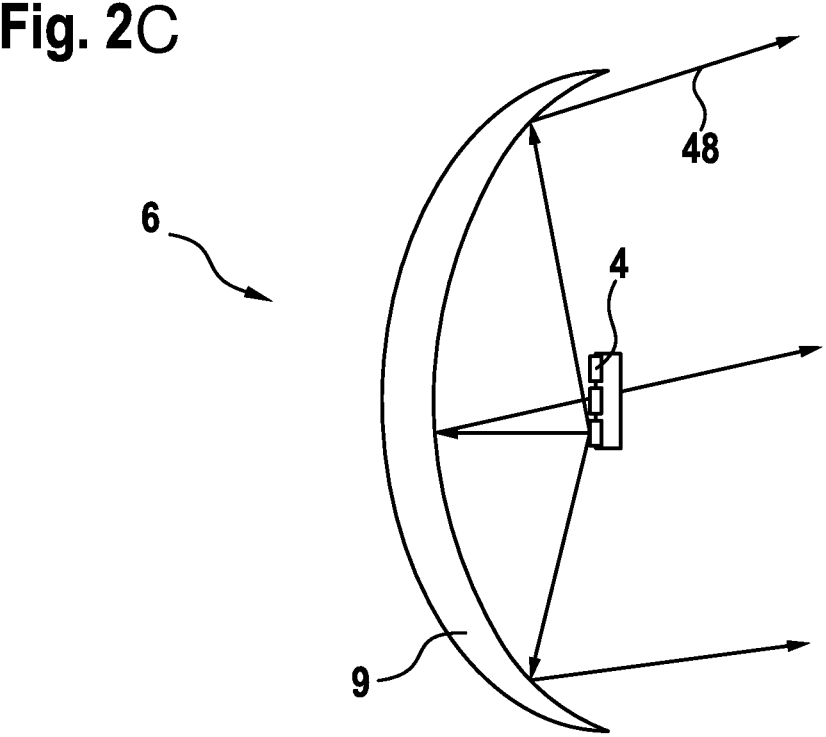

DYNAMIC AIRCRAFT HEADLIGHT AND METHOD OF OPERATING A DYNAMIC AIRCRAFT HEADLIGHT

FOREIGN PRIORITY

This application claims priority to European Patent Application No. 14 184 792.1 filed Sep. 15, 2014, the entire contents of which is incorporated herein by reference.

TECHNICAL FIELD

The present invention is in the field of exterior aircraft lighting. In particular, the present invention relates to aircraft headlights, i.e. such lights that help the pilots of the aircraft to view the environment in front of them, when operating the aircraft.

BACKGROUND OF THE INVENTION

Large commercial aircraft have many different exterior lights. An exemplary group of exterior aircraft lights are lights for passive visibility, such as navigation lights and anti-collision lights. Another example of exterior aircraft lights are headlights that allow the pilots to view the area in front of them, when they are seated in the cockpit. Large commercial aircraft have a variety of different headlights, such as taxi lights, take off lights, landing lights, and runway turn off lights. Depending on the current state of the aircraft, i.e. dependent on whether the aircraft is on the ground or in the air and depending on whether the pilots want to taxi straight or make a sharp turn, the pilots can switch on appropriate lights to have a good visibility of the relevant environment. The large number of headlights requires a lot of mounting space on the aircraft and a lot of wiring efforts for power and control lines.

Accordingly, it would be beneficial to provide an aircraft headlight that allows for reducing the number of headlights in an aircraft.

SUMMARY

Exemplary embodiments of the invention include a dynamic aircraft headlight, comprising an LED group, comprising a plurality of LEDs, and an optical system, comprising at least one optical element, the optical system being associated with the LED group for shaping an output light intensity distribution from the light emitted by the LED group, wherein the LED group and the optical system are stationary within the dynamic aircraft light unit, with each LED of the LED group having a set position with respect to the optical system and with a light output of each LED being affected differently by the optical system, wherein each LED of the LED group is individually controllable, and wherein the dynamic aircraft headlight is configured to be operated in a plurality of operating modes, with a respective selected subset of the plurality of LEDs being switched on in each of the plurality of operating modes and with a different output light intensity distribution being emitted by the dynamic aircraft headlight in each of the plurality of operating modes.

Exemplary embodiments of the invention allow for a reduction of the number of aircraft headlights, because the dynamic aircraft headlight in accordance with exemplary embodiments of the invention can combine the functionality of previously separate headlights. This is made possible by providing the plurality of operating modes that have different output light intensity distributions. In particular, the dynamic aircraft headlight can cover the aiming directions of previously separate headlights, because it provides different output light intensity distributions in different operating modes. An output light intensity distribution of a particular operating mode has a main light emission direction, i.e. a direction of peak intensity, and an opening angle around the main light emission direction.

As the LEDs are independently controllable, it is possible that one operating mode achieves the output light intensity distribution of a first prior art headlight, while another operating mode achieves the output light intensity distribution of a second prior art headlight. For example, instead of having a plurality of landing lights that respectively illuminate the ground for different descending angles and/or different angles of attack of the aircraft, as used in the prior art, the dynamic aircraft headlight according to exemplary embodiments of the invention may be able to cover the functionality of these different landing lights by itself by providing different aiming angles in different operating modes.

It is pointed out, however, that a combining of the functionality of previously separate headlights is not the only beneficial way of making use of the dynamic aircraft headlight. It is also possible that the functionalities may be re-distributed. For example, while a prior art approach may have employed two landing lights and two runway turn off lights, i.e. four lights for providing taxi and runway turn off functionality, it is possible to substitute these four lights by two of the dynamic aircraft headlights in accordance with exemplary embodiments of the invention, with each of these two lights having some taxi light functionality and some runway turn off light functionality in different operating modes.

It is important to note that the flexibility introduced by providing the dynamic aircraft headlight with a plurality of operating modes, each having a different output light intensity distribution, allows for re-grouping and/or combining the functionality of previously separate headlights, such that an overall reduction of the number of headlights is made possible. Moreover, the plurality of operating modes allow for a more granular covering of the environment of the aircraft, as compared to the previous discrete lights, such that blind spots between coverage areas of different lights of prior art approaches may be eliminated with the dynamic aircraft headlight.

The dynamic aircraft headlight is referred to as dynamic, because it is able to output different output light intensity distributions over time. In other words, it is dynamic, because it is able to assume different operating modes over time. The word dynamic does not imply that the dynamic aircraft headlight switches between the different operating modes out of its own motion. While this is possible, as will be explained below, it is also possible that the dynamic aircraft headlights reacts to external control commands and assumes an according operating mode as a reaction thereto.

The expression of the optical system shaping an output light intensity distribution from the light emitted by the LED group is to be understood in such a way that the optical system performs a transformation of the light intensity distribution as emitted by the LED group in a particular operating mode, also referred to as the source side light intensity distribution of that particular operating mode, into the output light intensity distribution of that particular operating mode.

The optical system is associated with the LED group. In other words, the optical system is arranged with respect to the LED group in such a way that at least a substantial portion of the light emitted by the LED group is emitted towards the optical system and is effected by the optical system. The light emitted by all LEDs of the LED group is affected by the optical system.

The optical system comprises at least one optical element. Optical elements may be reflectors and/or lenses. The optical system may comprise one or more reflectors or one or more lenses or a combination of one or more reflectors and one or more lenses.

Each LED of the LED group has a set position with respect to the optical system. In other words, the relative positioning of each LED of the LED group and the optical system is fixed. In this way, each LED has a unique position with respect to the optical system that is spaced apart from the positions of the other LEDs. Due to this unique position, the light output of each LED is affected differently by the optical system. In other words, the optical system has a different effect on the light emitted by each of the LEDs. In yet other words, the individual source side light intensity distribution of each LED experiences a different transformation by the optical system. The output light intensity distribution of a particular operating mode, as mentioned above, is a combination of the individual output light intensity distributions that result from those LEDs belonging to the respective selected subset and being switched on in the particular operating mode. If the optical system comprises a reflector, the reflector may reflect the light emitted by the individual LEDs differently. Analogously, if the optical system comprises a lens, the lens may refract the light emitted by the individual LEDs differently.

Each LED of the group is individually controllable. In other words, each LED of the LED group can be individually switched into an on state. In yet other words, each LED can be activated independently. In the on state, the LED may be operated at its nominal rating, i.e. it may emit light with its nominal light intensity. Each LED can also be in an off state. It may also be possible that each LED may be operated in a dimmed state. Such a dimmed state may be used to avoid hard transitions between illuminated areas and non-illuminated areas in the environment of the aircraft. An LED may be in an on state, when it emits light with at least 80% of its nominal light intensity. A highly dimmed operation of an LED, where the LED emits less than 50% of its nominal light intensity, is not considered an on state. In other words, an LED may be considered in an on state, when it emits at least 50% of its nominal light intensity, in particular at least 80% of its nominal light intensity.

The dynamic aircraft headlight may comprise a control unit that is configured to control each LED of the LED group independently. In other words, there may be provided a control unit that may put each LED of the LED group in an on state individually. In a particular embodiment, there may be provided a control unit that controls an individual on/off switch for each LED of the LED group. It is also possible that the control unit controls a dimming state of each LED of the LED group individually. Each of the LEDs is configured to emit light in operation. Accordingly, when switched on, each of the LEDs emits light.

The dynamic aircraft headlight may comprise a control unit that is configured to receive input data and to select one of the plurality of operating modes on the basis of the received input data. The input data may comprise command data received from a manual switch, such as a manual pilot switch for selecting an operating mode, and/or flight condition data received from aircraft operation sensors and/or from an aircraft board computer. The flight condition data may comprise one or more or any subset of ground roll data, aircraft speed data, aircraft yaw angle data, aircraft pitch angle data, aircraft roll angle data, aircraft descent angle data, aircraft height data, and aircraft distance to landing target data.

The dynamic aircraft headlight is configured to be operated in a plurality of operating modes. For each operating mode, a subset of the plurality of LEDs is predefined. In other words, for each operating mode, a fixed correlation exists between the particular operating mode and a particular subset of the plurality of LEDs. The predefined subset of LEDs, which are switched on for a particular operating mode, is referred to as the respective selected subset for that particular operating mode. A particular operating mode corresponds to a particular subset of the plurality of LEDs to be switched on. The term subset refers to a subgroup of the plurality of LEDs of the LED group, with the subset comprising at least one LED of the LED group, but not all LEDs of the LED group. In other words, the term subset refers to a particular selection of the plurality of LEDs. Accordingly, in any given operating mode, at least one LED is switched on and at least one LED is not switched on. It is also possible that two or more of the plurality of LEDs are switched on in each operating mode and/or that two or more of the plurality of LEDs are not switched on in each operating mode.

The operating modes differ from each other in that respectively different subsets of LEDs are switched on in each of the operating modes. As different subsets of the plurality of LEDs are switched on in the different operating modes and as every LED is affected differently by the optical system, the different operating modes all have different output light intensity distributions. The term operating modes refers to the modes of operation that the dynamic aircraft headlight may assume during the operation of the aircraft, i.e. during all the phases of a flight, including the taxiing to/from the gate and on the runway. In none of these operating modes, all LEDs of the dynamic aircraft headlight are switched on at the same time. This does not exclude, however, the possibility of providing a test mode where all LEDs of the dynamic aircraft headlight are switched on at the same time for testing purposes. Such a test mode is not considered an operating mode and may be carried out with all LEDs being in a dimmed state.

According to a further embodiment, less than 60%, in particular less than 50%, further in particular less than 40%, of the plurality of LEDs are switched on in each of the plurality of operating modes. In other words, the respective selective subset of LEDs being switched on may comprise less than 60%, in particular less than 50%, further in particular less than 40%, of the plurality of LEDs for each of the plurality of operating modes. In this way, the dynamic aircraft headlight may provide for different output light intensity distributions, as discussed above, while keeping the maximum power consumption below a predefined level that corresponds to the maximum number of LEDs that can be switched on at any given time. In this way, the design of the power wiring to the dynamic aircraft headlight only has to be able to support said maximum power consumption. Also, in this way, the maximum load that the dynamic aircraft headlight may pose on the aircraft electricity network is significantly below the load that all of the LEDs would create when switched on at the same time. Moreover, by having less than 60%, in particular less than 50%, further in particular less than 40%, of the plurality of LEDs switched on in each of the plurality of operating modes, the overall heat dissipation may be kept below a threshold level, which in turn allows for keeping the operating temperature of the dynamic aircraft headlight below a threshold level and thus for limiting the thermal stress on the electronic components.

According to a further embodiment, the respective selected subset of the plurality of LEDs in operation emit a respective source side light intensity distribution that is an optical image of a desired output light intensity distribution for the operating mode in question. During a given flight condition of the aircraft, a particular output light intensity distribution may be desired to provide good visibility for the pilots. Knowing the transformation the optical system exerts on the source side light intensity distribution, selecting the subset of the plurality of LEDs in such a way that their combined source side light intensity distribution is the optical image of the desired output light intensity distribution will result in the desired output light intensity distribution being emitted by the dynamic aircraft headlight in the operating mode in question. By choosing the subset of the plurality of LEDs in such a way that an appropriate optical image of the desired output light intensity distribution is emitted, the optical system is able to achieve the desired transformation.

According to a further embodiment, the plurality of LEDs of the LED group are arranged in one of a two-dimensional LED array and a linear LED row. The term two-dimensional LED array is to be understood in such a way that the plurality of LEDs are not arranged in a row-like or line-like configuration, but that the plurality of LEDs are spaced apart from each other in two dimensions. Within the two-dimensional LED array, the plurality of LEDs may be arranged in a regular pattern or in an irregular manner. The two-dimensional LED array may be a two-dimensional LED matrix, wherein the plurality of LEDs are arranged in a rectangular area in an evenly spaced manner. Such an arrangement allows for great flexibility to create many useful operating modes. It is also possible that the plurality of LEDs are arranged in a linear LED row. Such an arrangement allows for a plurality of operating modes whose output light intensity distributions substantially differ in one dimension only. This may be sufficient for a variety of applications.

According to a further embodiment, the dynamic aircraft headlight comprises a plurality of LED groups and a plurality of optical systems, wherein each LED group of the plurality of LED groups is associated with one of the plurality of optical systems for shaping a respective output light intensity distribution from the light emitted by the respective LED group. The overall output light intensity distribution of the dynamic aircraft headlight is the combination of the respective output light intensity distributions of the individual LED groups, as transformed by the respective optical systems. In this way, it is possible that some of the LEDs of the dynamic aircraft headlight cooperate with a first optical system, while other LEDs of the dynamic aircraft headlight cooperate with a second optical system, etc. One LED group and one optical system may jointly form a functional unit. By having a plurality of such functional units, the creation of the overall output light intensity distribution of the dynamic aircraft headlight may be split up. In this way, the dimensions of the optical systems of each functional unit may be less complex and may have smaller dimensions, as compared to a case where all LEDs of the dynamic aircraft headlight are associated with exactly one optical system. Also, re-enforcing effects between the functional units can be made use of for shaping the overall output light intensity distribution. In particular, the individual output light intensity distributions of particular operating modes of different functional units may overlap or coincide, such that particularly high light intensities can be achieved in particular output directions and/or under particular flight conditions.

In particular embodiments, each of the plurality of LED groups and each of the plurality of optical systems may be configured in any of the manners discussed above with respect to the situation of one LED group and one optical system being present. In particular, each LED group may comprise a respective plurality of LEDs. Each optical system may comprise at least one optical element, respectively. Each LED group and its associated optical system may be stationary within the dynamic aircraft light unit, with each LED of the particular LED group having a set position with respect to its associated optical system and with a light output of each LED of the particular LED group being affected differently by the associated optical system. Each LED of each LED group may be individually controllable. In each of the LED groups, a respective selective subset of the plurality of LEDs of the particular LED group may be switched on in each of the plurality of operating modes.

According to a further embodiment, the plurality of operating modes comprise at least two of a landing light mode, a take off light mode, a taxi light mode, and a runway turn off light mode. In particular, the plurality of operating modes may comprise exactly two of the landing light mode, the take off light mode, the taxi light mode, and the runway turn off light mode. Further in particular, the plurality of operating modes may comprise exactly three of the landing light mode, the take off light mode, the taxi light mode, and the runway turn off light mode. Further in particular, the plurality of operating modes may comprise all of the landing light mode, the take off light mode, the taxi light mode, and the runway turn off light mode. It is also possible that the plurality of operating modes comprises combined operating modes, such as a combined taxi light and runway turn off light mode. Further, it is also possible that the plurality of operating modes comprises a plurality of landing light modes and/or a plurality of take off light modes and/or a plurality of taxi light modes and/or a plurality of runway turn off light modes. In each or at least some of the operating modes, the dynamic aircraft headlight may provide an output light intensity distribution that is in conformity with a required light intensity distribution for certain flight conditions. For example, in each or at least some of the operating modes, the dynamic aircraft headlight may provide illumination compliant with SAE ARP 693 (SAE Aircraft Recommended Practice 693). This document is an example of a collection of requirements/recommendations/de facto standards for the headlights of an aircraft. It is also possible that the dynamic aircraft headlight provides output light intensity distributions in all or some of the operating modes that are in compliance with other regulations or with requirements set by aircraft manufacturers, etc.

According to a further embodiment, the dynamic aircraft headlight is configured to select one of the operating modes based on control data received from a manual switch and/or to select one of the operating modes based on flight condition data received from aircraft operation sensors, such as a ground roll sensor, and/or from an aircraft board computer. In this way, the dynamic aircraft headlight allows for being controlled by the pilot or for being automatically controlled on the basis of available information. It is also possible that a combined control is present, according to which the dynamic aircraft headlight is generally automatically controlled, but the automatic control can be overridden by the pilots. For example, the ground roll sensor may sense if the aircraft is on the ground or in the air and may pass on that information either to the aircraft, from where it is passed on to the dynamic aircraft headlight, or directly to the dynamic aircraft headlight. During the descent of the aircraft, the landing light mode or one of the landing light modes may be present in the dynamic aircraft headlight. Upon detecting the touchdown of the aircraft by the ground roll sensor, the dynamic aircraft headlight may end the landing light mode and switch into the taxi light mode.

According to a further embodiment, the plurality of operating modes comprises a plurality of landing light modes, wherein the output light intensity distribution of each of the plurality of landing light modes has a main light emission direction and wherein the plurality of landing light modes have different respective main light emission directions. In other words, the plurality of landing light modes differ with respect to their main light emission directions. In yet other words, the plurality of landing light modes differ with respect to the angle, at which the peak light intensity is emitted from the dynamic aircraft headlight. This angle may be measured with respect to a direction normal to the lens cover of the dynamic aircraft headlight or may be measured with respect to the longitudinal extension of the aircraft body or any other suitable reference direction. The angle may be represented as a two-dimensional angle with respect to two different reference planes and may have a vertical angle component and a horizontal angle component.

By providing different landing light modes, the dynamic aircraft headlight may adapt to the particular flight conditions during descent. In particular, the landing light mode may be selected in such a way that the main light emission direction of the selected landing light mode aims towards the landing target, such as the landing runway. The selected landing mode may compensate for deviations of the yaw angle, the pitch angle, and/or the descent angle of the aircraft, as compared to ideal descent scenarios. In this way, the dynamic aircraft headlight may be able to replace previously separate headlights that were provided for covering different descent scenarios. Moreover, the dynamic aircraft headlight may be able to illuminate the target area even in scenarios where previous headlight configurations had blind spots or where previous headlight configurations were unable to reach the target area.

It is pointed out that the number of operating modes correlates to the number of LEDs present in the dynamic aircraft headlight. The number of LEDs poses a limitation on the number of combinations of switched on LEDs. Further, the arrangement of the LEDs with respect to the optical system(s) and the configuration(s) of the optical system(s) determine how different the output light intensity distributions in the individual operating modes are.

According to a further embodiment, the dynamic aircraft headlight is configured to select one of the landing light modes based on at least one of an aircraft yaw angle, an aircraft pitch angle, a descent angle, an aircraft height, and an aircraft distance to a landing target. A direction to the landing target may be derived from at least one of the aircraft yaw angle, the aircraft pitch angle, the descent angle, the aircraft height, and the aircraft distance to the landing target. The derivation of the direction to the landing target may be an exact calculation or an estimate, depending which parameters are available at which accuracy. The selection of the one of the landing light modes may be based on the direction to the landing target. By selecting the appropriate landing light mode, illumination may be provided in the direction to the landing target or in a direction that is a sufficiently good estimate of the direction to the landing target. The pilots may thus have an easier approach to the landing target, as they can see their target even in uncommon flight conditions.

It is pointed out that not all of said parameters are needed for determining or estimating the direction to the landing target. For example, the descent angle may be calculated from the aircraft height and the aircraft distance to the landing target, and vice versa. It is also possible to make assumptions for those values if they are not available. For example, it can be assumed that the descent angle and the aircraft pitch angle are those angles that are the recommended aircraft pitch angle and descent angle for a particular aircraft type. Further, if there is no momentary yaw angle available, it can be assumed that the yaw angle is zero, which represents the ideal descent scenario without crosswind. The dynamic aircraft headlight may be configured to select one of the landing light modes based on any subset of the parameters of the aircraft yaw angle, the aircraft pitch angle, the descent angle, the aircraft height, the aircraft distance to the landing target, and potentially other parameters. If none of the values are available, e.g. due to a lost connection to the aircraft or due to a loss of one or more sensors, reasonable assumptions may be made for all the values, e.g. ideal descent scenarios may be assumed, to provide a fail-safe operating mode.

According to a further embodiment, the dynamic aircraft headlight comprises at least one sensor configured to sense at least one of the aircraft yaw angle, the aircraft pitch angle, the descent angle, the aircraft height, and the aircraft distance to the landing target. In this way, the dynamic aircraft headlight may be a closed system that may calculate or estimate the direction to the landing target without any external input. In this way, the dynamic aircraft headlight may select a suitable landing mode without having to interact with the aircraft for obtaining information therefrom.

According to an alternative embodiment, the dynamic aircraft headlight is configured to receive at least one of the aircraft yaw angle, the aircraft pitch angle, the descent angle, the aircraft height and the aircraft distance to the landing target from aircraft operation sensors and/or from an aircraft board computer. In this way, the dynamic aircraft headlight may rely on one or more of said parameters, as already sensed/calculated by the aircraft. Most aircraft put a lot of emphasis on highly reliable data for flight security, such that the dynamic aircraft headlight may be able to perform an optimized selection of the appropriate landing light mode on the basis of this data provided by the aircraft.

In case the dynamic aircraft headlight comprises its own at least one sensor, the dynamic aircraft headlight may perform suitable filtering of the sensed data. For example, the dynamic aircraft headlight may comprise a high pass filter to extract fast movements of the aircraft. Fast movements may be such movements that happen within an interval of e.g. 10 s. Such movements of the aircraft may be interpreted as relating to short term attitude alterations of the aircraft that may be induced by wind or air density changes. The dynamic aircraft headlight may be configured to immediately react to such fast movements. It may be configured to constantly select an appropriate landing light mode as a response thereto. Longer term changes in attitude may be interpreted as a trend of a change in the respective parameter, such as a change of the angle of attack or of the descent angle. The dynamic aircraft headlight may be configured to react to such trends with a predefined delay, in order to not switch the operating modes too often and to not distract the pilot. In case the dynamic aircraft headlight receives flight condition data from the aircraft, this data may be viewed as reliable and the dynamic aircraft headlight may be configured to react to this data immediately.

According to a further embodiment, the dynamic aircraft headlight is configured to select one of the landing light modes such that the main light emission direction of the selected one of the landing light modes is the main light emission direction of the plurality of main light emission directions of the plurality of landing light modes that points closest to the landing target. In other words, that particular landing light mode is selected that has its peak light intensity closer to the landing target than the other landing light modes. In yet other words, the landing light mode to be used is selected by minimizing a deviation between the direction to the landing target and the main light emission direction of the landing light modes. In this way, the landing light mode may be selected via a simple comparison of two directions for each of the landing light modes. Further, the peak light intensity close to the landing target may provide for very good visibility of the landing target. It is pointed out, however, that the selection of the landing light mode may also be based on different criteria. A further example may be the selection of a landing light mode such that an overlap between an extended landing target and the output light intensity distribution of the landing light mode is maximized.

According to a further embodiment, the output light intensity distribution of each of the plurality of landing light modes has an opening angle of less than 15°, in particular of between 5° and 10°, around the respective main light emission distribution. Such opening angles have been found to be a good compromise between providing a targeted output light intensity distribution at acceptable power consumption levels, while providing for sufficient breadth of the output light intensity distribution for the case that the direction to the target and the main light emission direction of the selected operating mode do not exactly correspond. Also, said opening angle values allow for good visibility of extended landing targets as well as for being aware of obstacles that are in close proximity of the landing target.

According to a further embodiment, the output light intensity distributions of all operating modes have a combined horizontal opening angle of between 30° and 60°, in particular of between 35° and 45°, and/or a combined vertical opening angle of between 10° and 30°, in particular of between 15° and 25°. The terms horizontal opening angle and vertical opening angle refer to the orientation of the dynamic aircraft headlight when mounted to the aircraft. In particular, the horizontal opening angle is the opening angle of the dynamic aircraft headlight in a horizontal cross-sectional plane, and the vertical opening angle is the opening angle of the dynamic aircraft headlight in a vertical cross-sectional plane through the dynamic aircraft headlight. With such combined opening angles, the dynamic aircraft headlight is particularly well-configured to react to a wide variety of different flight conditions for the landing light functionality and to provide at least part of the light intensity distributions for inherently different headlight operating modes, such as taxi light mode, runway turn off light mode, take off light mode, and landing light mode. It is pointed out that the limit values, as stated above for the combined opening angles, do not require the light intensity to drop to zero at these angles. Rather, the limit values may be defined as angles where the light intensity distribution of the most outward operating mode has dropped to below 10% of the peak intensity of that operating mode.

According to a further embodiment, a combination of the output light intensity distributions of all operating modes forms a symmetrical light intensity distribution. The combination of the output light intensity distributions of all operating modes may be symmetrical in a horizontal dimension with respect to a vertical axis of symmetry and/or symmetrical in a vertical dimension with respect to a horizontal axis of symmetry. It is, however, also possible that the combination of the output light intensity distributions of all operating modes forms a non-symmetrical light intensity distribution.

According to a further embodiment, a combination of the output light intensity distributions of all operating modes has the same distribution in a first dimension for different values of a second dimension. For example, the combination of the output light intensity distributions of all operating modes may have the same horizontal distribution for different vertical angles or vice versa. In this way, the same light intensity distribution may be provided in different operating modes, just aiming into a different vertical/horizontal direction.

According to a further embodiment, the number of LEDs of the dynamic aircraft headlight is at least 20, in particular at least 30, further in particular at least 40. With such a high number of LEDs, a high number of operating modes can be implemented. The LEDs of the dynamic aircraft headlight may be arranged in one LED group, being associated with one optical system, or in a plurality of LED groups, being associated with a plurality of optical systems. The number of LEDs of the dynamic aircraft headlight may be below 70, in particular below 60.

Exemplary embodiments of the invention further include a set of dynamic aircraft headlights, comprising a central dynamic aircraft headlight, as described in any of the embodiments above, configured to be mounted to a front running gear of an aircraft, a right dynamic aircraft headlight, as described in any of the embodiments above, configured to be mounted to a right wing structure of an aircraft, and a left dynamic aircraft headlight, as described in any of the embodiments above, configured to be mounted to a left wing structure of an aircraft. Such a set of dynamic aircraft headlights may be configured to take over all of the landing light, take off light, taxi light and runway turn off light functionality of an aircraft. In particular, it may satisfy all requirement as laid out in the recommendations of SAE ARP 693.

According to a further embodiment, the central dynamic aircraft headlight may be configured to be mounted to the front running gear in such a way that it is oriented straight ahead, while the left and right dynamic aircraft headlights may be oriented in such a way that they are oriented at between 10° and 20°, in particular at around 15°, to the left and to the right, respectively. In other words, the central dynamic aircraft headlight and the left and right dynamic aircraft headlights may be horizontally angled with respect to each other. This angled orientation of the central, right and left dynamic aircraft headlights is an efficient way of providing a +/−55° illumination area at a distance of 15 m from the cockpit. Such +/−55° illumination may be required by aircraft regulations or recommendations or de facto standards.

According to a further embodiment, the central dynamic aircraft headlight, the right dynamic aircraft headlight and the left dynamic aircraft headlight are configured to have similar maximum power consumptions. In particular, the left and right dynamic aircraft headlights may have a maximum power consumption of between 50% and 150%, in particular of between 80% and 120%, of the maximum power consumption of the central dynamic aircraft headlight.

Exemplary embodiments of the invention further include an aircraft having at least one dynamic aircraft headlight, as described in any of the embodiments above. In particular, the aircraft may also have two or more dynamic aircraft headlights, as described in any of the embodiments above. Further in particular, the aircraft may have a set of dynamic aircraft headlights, as described above. All modifications, features and advantages, described above with respect to the dynamic aircraft headlight and with respect to the set of dynamic aircraft headlights, apply to the aircraft in an analogous manner.

Exemplary embodiments of the invention further include a method of operating a dynamic aircraft headlight, the dynamic aircraft headlight comprising an LED group, comprising a plurality of LEDs, and an optical system, comprising at least one optical element, the optical system being associated with the LED group for shaping an output light intensity distribution from the light emitted by the LED group, wherein the LED group and the optical system are stationary within the dynamic aircraft light unit, with each LED of the LED group having a set position with respect to the optical system and with a light output of each LED being affected differently by the optical system, and wherein each LED of the LED group is individually controllable, the method comprising the steps of at least one of receiving command data from a manual switch and receiving flight condition data from one of aircraft operation sensors and an aircraft board computer; based on the at least one of command data and flight condition data, selecting one of a plurality of operating modes of the dynamic aircraft headlight, with each operating mode having a different output light emission distribution; and based on the selected one of the plurality of operating modes, switching a respective selected subset of the plurality of LEDs on, resulting in a particular output light emission distribution associated with the selected one of the plurality of operating modes. All modifications, features and advantages, described above with respect to the embodiments of the dynamic aircraft headlights, apply to the method of operating the dynamic aircraft headlight in an analogous manner.

BRIEF DESCRIPTION OF DRAWINGS

Further exemplary embodiments of the invention are described with respect to the accompanying drawings, wherein:

FIG. 2A, FIG. 2B and FIG. 2C, collectively referred to as FIG. 2 shows a schematic illustration of a combination of an LED group and an optical system, which are to be used in a dynamic aircraft headlight in accordance with an exemplary embodiment of the invention, in three different operating modes.

DETAILED DESCRIPTION OF THE INVENTION

Figure 1A:
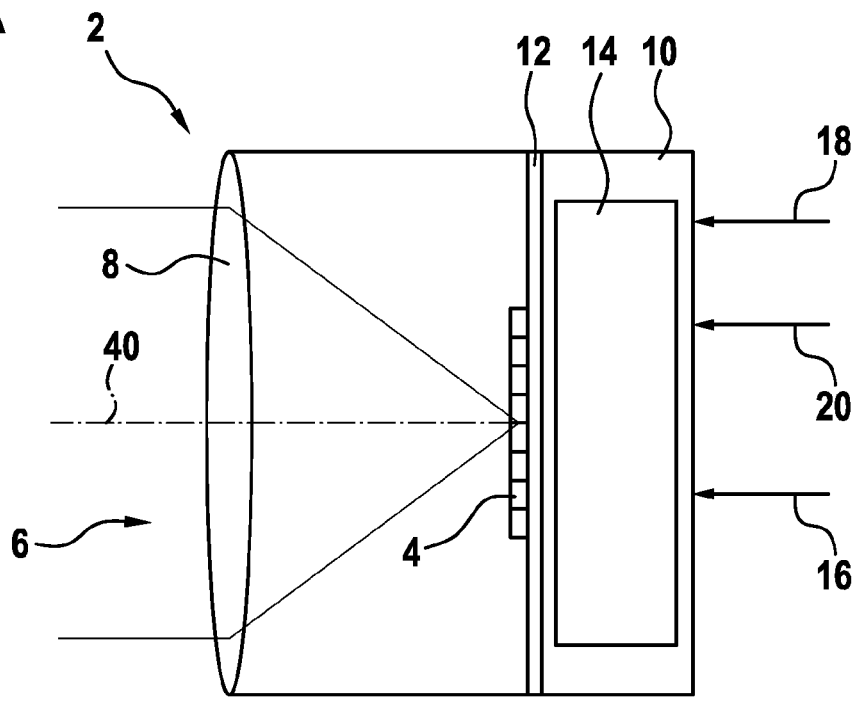
FIG. 1A and FIG. 1B, collectively referred to as FIG. 1 shows a schematic illustration of a dynamic aircraft headlight in accordance with an exemplary embodiment of the invention in two operating modes.

FIG. 1A shows a schematic illustration of a dynamic aircraft headlight 2 in accordance with an exemplary embodiment of the invention. The dynamic aircraft headlight 2 comprises a housing 10, whose inner space is separated into two parts by a mounting plate 12. Attached to the mounting plate 12, there is provided an LED group 4. The LED group 4 consists of eight individual LEDs arranged in a linear configuration in the exemplary embodiment of FIG. 1A. The dynamic aircraft headlight 2 further comprises an optical system 6. In the exemplary embodiment of FIG. 1A, the optical system 6 consists of a lens 8. In operation, the LEDs of the LED group 4 emit light towards the lens 8 of the optical system 6.

On the other side of the mounting plate 12, there is provided a control unit 14. The control unit 14 is coupled to a power input 16, to a flight condition data input 18 and to a ground roll sensor input 20. In this way, the control unit 14 receives power from an external power source, such as the aircraft power network, via the power input 16. It further receives flight condition data via the flight condition data input 18. In the exemplary embodiment of FIG. 1A, the flight condition data includes the momentary angle of attack of the aircraft, also referred to as aircraft pitch angle, the momentary angle of descent of the aircraft, and the momentary yaw angle of the aircraft. The control unit 14 further receives an indication about the aircraft being on the ground or in the air from a ground roll sensor via the ground roll sensor input 20.

The control unit 14 is further coupled to the LED group 4 and controls each of the LEDs of the LED group 4 individually. In particular, the control unit 14 is configured to selectively switch each of the LEDs of the LED group 4 on, depending on the operating mode that the control unit 14 determines appropriate for the present flight conditions/present ground roll conditions. The control unit 14 determines the appropriate operating mode on the basis of the information received via the flight condition data input 18 and the ground roll sensor input 20. Further details of setting an appropriate operating mode will be described below.

In FIG. 1A, a first operating mode of the dynamic aircraft headlight 2 is shown. In the first operating mode, the two center LEDs of the LED group 4 are switched on, i.e. the two center LEDs emit light in the first operating mode. As can be seen from the depicted three exemplary light rays, the lens 8 substantially collimates the light emitted by the LED group 4 and outputs said light in a first main light emission direction 40. In the first operating mode, the main light emission direction of the dynamic aircraft headlight 2 is through the center line 40 of the dynamic aircraft headlight 2. The output light intensity distribution of the first operating mode has a very small opening angle around the main light emission direction 40 of the first operating mode.

Figure 1B:
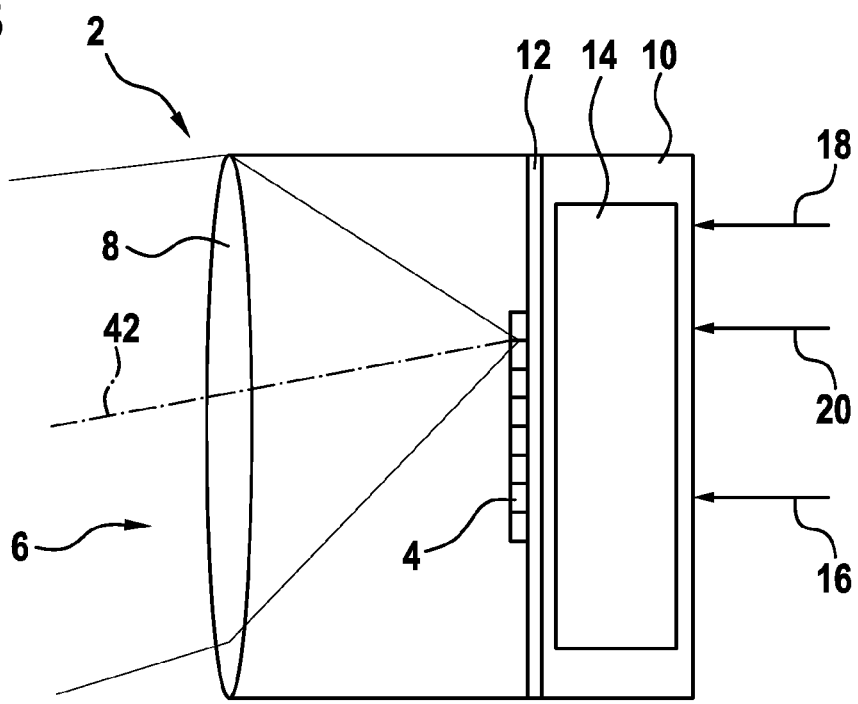

In FIG. 1B, a second operating mode of the dynamic aircraft headlight 2 of FIG. 1A is shown. In particular, in the second operating mode, the top two LEDs of the LED group 4 are switched on. The light emitted by the two top LEDs of the LED group 4 is transformed into an output light intensity distribution of the second operating mode by the lens 8. As can be seen from the three depicted exemplary light rays, the light of the top two LEDs of the LED group 4 results in an output light intensity distribution that is angled somewhat towards the bottom in the drawing plane of FIG. 1B. The main light emission direction 42 of the output light intensity distribution of the second operating mode is slightly angled towards the bottom in the drawing plane of FIG. 1B, with the opening angle of the output light intensity distribution of the second operating mode being somewhat wider than in FIG. 1A, but still being fairly narrow.

From the comparison of FIG. 1A and FIG. 1B, it can be seen that the dynamic aircraft headlight 2 has various operating modes and that the output light intensity distributions of these different operating modes are different. In this way, the dynamic aircraft headlight is able to provide a plurality of different output light intensity distributions without any moving parts within the dynamic aircraft headlight 2. The provision of different operating modes is effected via the switching of different LEDs of the LED group 4.

FIG. 2 shows a schematic illustration of an alternative combination of an optical system 6 and an LED group 4. This alternative combination is also able to achieve different output light intensity distributions for different operating modes and may thus also be used in dynamic aircraft light units in accordance with exemplary embodiments of the invention.

In FIG. 2, the optical system consists of a reflector 9, which is a collimating parabolic reflector in the exemplary embodiment of FIG. 2. The center LED of the LED group 4 is arranged in the focal point of the reflector 9, leading to a collimated output light intensity distribution in a first operating mode (FIG. 2A), wherein the center LED is switched on. The top and bottom LEDs of the LED group 4 are arranged at a distance from the focal point of the reflector 9, such that the switching on of the top LED or of the bottom LED of the LED group 4 results in an output light intensity distribution that is angled towards the bottom (FIG. 2B) or angled towards the top (FIG. 2C) and has a somewhat wider, but still narrow opening angle. Again, it can be seen that the selective switching of different LEDs of the LED group 4 in different operating modes leads to different output light intensity distributions.

It is pointed out that the optical system 6 may comprise multiple elements, that the optical system 6 may comprise a combination of one or more lenses and/or one or more reflectors, and that the lenses and reflectors may be non-collimating lenses and non-collimating reflectors, depending on the output light intensity distributions that are to be achieved in the different operating modes. It is further pointed out that larger numbers of operating modes may be achieved with larger numbers of LEDs and/or with arrangements of LEDs in two dimensions. The principles illustrates in FIGS. 1 and 2 may be extended to more complex LED arrangements within the dynamic aircraft headlight 2. Also, the dynamic aircraft headlight 2 may have multiple LED groups and multiple optical systems, with respective combinations of one LED group and one optical system forming a respective functional unit.

Figure 3A:
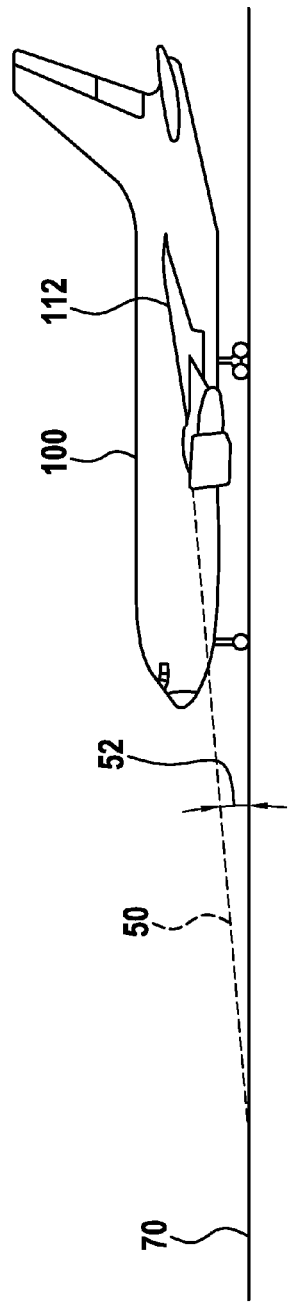
FIG. 3A and FIG. 3B, collectively referred to as FIG. 3 shows an aircraft, equipped with a dynamic aircraft headlight in accordance with an exemplary embodiment of the invention, in a rolling condition and in a descent condition.

FIG. 3 shows the operation of an exemplary dynamic aircraft headlight 102, as mounted to an exemplary aircraft 100, in two different operating modes. In FIG. 3A, a ground roll condition of the aircraft 100 is depicted. The aircraft 100 is equipped with a dynamic aircraft headlight 102 in accordance with an exemplary embodiment of the invention, mounted to a left wing structure 112 of the aircraft 100. In FIG. 3A, the aircraft 100 is shown during a taxi operation on the airfield.

During such a taxi operation, an output light intensity distribution is desired that is angles slightly towards the ground. For this reason, the dynamic aircraft headlight 102 is configured to select a taxi light operating mode that has its main light emission direction along angled line 50. The main light emission direction 50 of the first operating mode has an angle 52 with respect to the longitudinal extension of the aircraft 100. The dynamic aircraft headlight may receive the desired angle 52 via a flight condition data input and select an appropriate taxi light operating mode on the basis thereof. It is also possible that the dynamic aircraft headlight has the angle 52 preprogrammed in its memory, such that the dynamic aircraft headlight is able to enter this selected taxi light operating mode solely based on the information that the aircraft 100 is on the ground.

Figure 3B:
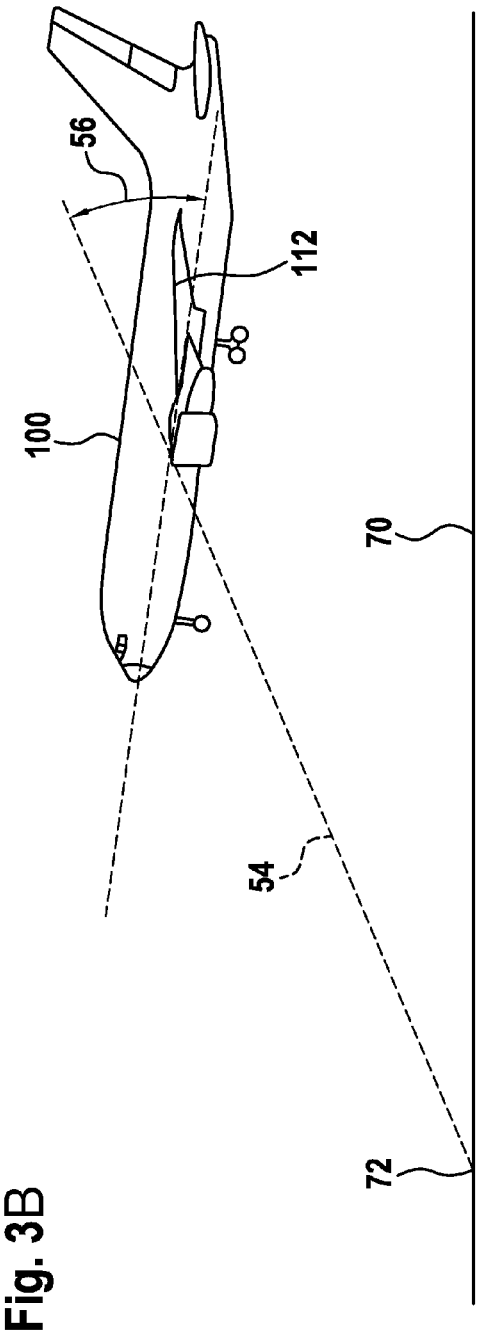

In contrast thereto, FIG. 3B shows the aircraft 100 of FIG. 3A in an in-flight condition. In particular, FIG. 3B shows the aircraft 100 in a descent towards a landing target 72. The landing target 72 may be a point target or an extended target region. During this flight condition, the dynamic aircraft headlight 102 assumes one of a plurality of landing light modes. In the exemplary embodiment of FIG. 3, the dynamic aircraft headlight is configured to receive the descent slope information and the angle of attack information from the aircraft board computer. The sum of these two angles constitutes the angle 56 between the descent slope 54 and the longitudinal extension of the aircraft 100. Based on the information about this angle 56, the dynamic aircraft headlight 102 is configured to select an appropriate landing light operating mode. In particular, the dynamic aircraft headlight 102 selects a landing light operating mode that provides a landing light output light intensity distribution at an angle 56 with respect to the horizontal plane of the aircraft 100 (i.e. with respect to the plane through the aircraft that is horizontal when the aircraft is on the ground). In this way, the pilots are able to clearly see the landing target 72. It is apparent that the dynamic aircraft headlight can switch between various operating modes and can thus adapt to any changes of the angle 56, no matter if a change to the angle 56 happens during one particular descent or if the angle 56 is different from descent to descent.

Figure 4:
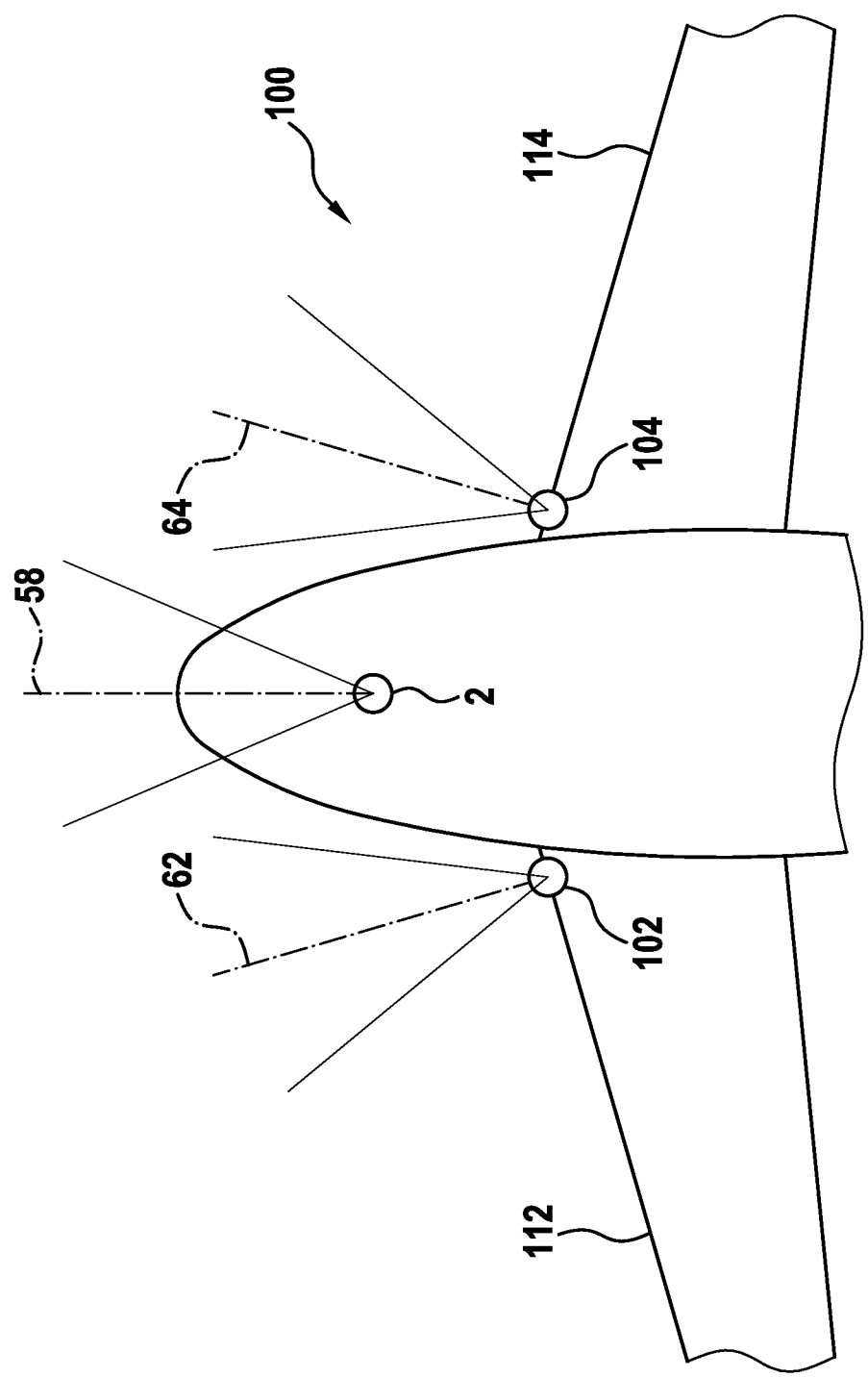
FIG. 4 shows an aircraft, equipped with a set of dynamic aircraft headlights in accordance with an exemplary embodiment of the invention, in a top view.

FIG. 4 shows an exemplary aircraft 100, equipped with three dynamic aircraft headlights 2, 102 and 104 in accordance with exemplary embodiments of the invention. The aircraft 100 is shown in a top view in FIG. 4, with the aircraft fuselage 110, the left wing structure 112 and the right wing structure 114 being shown in FIG. 4. The aircraft 100 is equipped with a central dynamic aircraft headlight 2, which is mounted to a front running gear of the aircraft 100. The aircraft 100 is further equipped with a left dynamic aircraft headlight 102 and a right dynamic aircraft headlight 104, which are mounted to the respective fronts of the respective roots of the left and right wing structures 112, 114. The left and right dynamic aircraft headlights 102, 104 are spaced from the central dynamic aircraft headlight 2 by a distance of 10 m in a longitudinal direction and by a distance of 3 m in a lateral direction.

The central dynamic aircraft headlight 2 of the exemplary embodiment of FIG. 4 is oriented straight ahead. In other words, the combined light intensity distribution of all output light intensity distributions of all operating modes extends to the same angles towards the left and towards the right from the straight ahead direction 58. In yet other words, the center line of the combined light intensity distribution of all output light intensity distributions of all operating modes coincides with the straight ahead direction 58, which in turn coincides with the longitudinal direction of extension of the aircraft fuselage 110.

The left and right dynamic aircraft headlights 102, 104 are angled with respect to this straight ahead orientation of the central dynamic aircraft headlight 2. In particular, the left dynamic aircraft headlight 102 is angled at 15° towards the left from the straight ahead direction 58. This can also be described as follows: a central line 62 of the combined light intensity distribution of all output light intensity distributions of all operating modes of the left dynamic aircraft headlight 102 is angled at 15° towards the left from the straight ahead direction 58. Analogously, the right dynamic aircraft headlight 104 is angled towards the right at an angle of 15°.

In this way, the combined opening angle of the three dynamic aircraft headlights 2, 102 and 104 is 70°. At a distance of 15 m from the cockpit, the three dynamic aircraft headlights are able to jointly provide an illumination of a 110° area, as seen from the cockpit, due to their different longitudinal and lateral positions. This illumination of a 110° area is sufficient to satisfy SAE ARP 693 recommendations for the overall horizontal illumination capacities of aircraft headlights.

Particular examples of the light intensity distributions that can be achieved with the three dynamic aircraft headlights 2, 102 and 104 will now be described. Table 1 shows the light intensity values that are achieved for the case of illuminating all LEDs of the right dynamic aircraft headlight 104. The light intensity values are shown as a function of a horizontal angle with respect to the longitudinal extension of the aircraft fuselage and a vertical angle with respect to a horizontal plane through the headlight (when the aircraft is on the ground). The values of Table 1 show the light intensities that can be achieved for particular emission directions and that are available for putting together desired output light intensity distributions for particular operating modes of the right dynamic aircraft headlight 104. It is pointed out that the light intensity between the given values is not zero. To the contrary, in the present exemplary embodiment, the given light intensity distributions are continuous light intensity distributions. The given values are merely selected points of the continuous light intensity distributions. Wherever there are no values given, the light intensity is zero or below a significance threshold, such as below 10% of the maximum light intensity of the light intensity distribution in question.

TABLE 1

|     | −35 | −30 | −25 | −20 | −15 | −10 | −5 | 0 | 5 | 10 | 15 | 20 | 25 | 30 | 35 |
|---|---|---|---|---|---|---|---|---|---|---|---|---|---|---|---|
| 5   |     |     |     |     |     |     | 450 | 450 | 450 | 450 | 450 | 300 | 40 | 40 | 40 |
| 0   |     |     |     |     |     |     | 450 | 450 | 450 | 450 | 450 | 300 | 50 | 50 | 50 |
| −5  |     |     |     |     |     |     | 450 | 450 | 450 | 450 | 450 | 300 | 40 | 40 | 40 |
| −10 |     |     |     |     |     |     | 450 | 450 | 450 | 450 | 450 | 300 |    |    |    |
| −15 |     |     |     |     |     |     | 450 | 450 | 450 | 450 | 450 | 300 |    |    |    |

The values of Table 1 are provided in thousands of candela, i.e. in 1000 cd. For example, in the direction parallel to the longitudinal extension of the aircraft fuselage, i.e. in the direction of 0° horizontally and 0° vertically with the longitudinal direction of the aircraft fuselage, the achievable light intensity is 450,000 cd. In another example, in the direction of 35° towards the right of the longitudinal extension of the aircraft fuselage and 5° towards the bottom, the achievable light intensity is 40,000 cd.

The following Tables 2-4 show analogous light intensity values for the central dynamic aircraft headlight 2 (Table 2), for the left dynamic aircraft headlight 102 (Table 3), and for a combination of the three dynamic aircraft headlights 2, 102 and 104 (Table 4).

TABLE 2

|     | −35 | −30 | −25 | −20 | −15 | −10 | −5 | 0 | 5 | 10 | 15 | 20 | 25 | 30 | 35 |
|---|---|---|---|---|---|---|---|---|---|---|---|---|---|---|---|
| 5   |     |     |     | 300 | 350 | 350 | 350 | 350 | 350 | 350 | 350 | 300 |    |    |    |
| 0   |     |     |     | 300 | 350 | 350 | 350 | 350 | 350 | 350 | 350 | 300 |    |    |    |
| −5  |     |     |     | 300 | 350 | 350 | 350 | 350 | 350 | 350 | 350 | 300 |    |    |    |
| −10 |     |     |     | 300 | 350 | 350 | 350 | 350 | 350 | 350 | 350 | 300 |    |    |    |
| −15 |     |     |     | 300 | 350 | 350 | 350 | 350 | 350 | 350 | 350 | 300 |    |    |    |

TABLE 3

|     | −35 | −30 | −25 | −20 | −15 | −10 | −5 | 0 | 5 | 10 | 15 | 20 | 25 | 30 | 35 |
|---|---|---|---|---|---|---|---|---|---|---|---|---|---|---|---|
| 5   | 40 | 40 | 40 | 300 | 450 | 450 | 450 | 450 | 450 |    |    |    |    |    |    |
| 0   | 50 | 50 | 50 | 300 | 450 | 450 | 450 | 450 | 450 |    |    |    |    |    |    |
| −5  | 40 | 40 | 40 | 300 | 450 | 450 | 450 | 450 | 450 |    |    |    |    |    |    |
| −10 |    |    |    | 300 | 450 | 450 | 450 | 450 | 450 |    |    |    |    |    |    |
| −15 |    |    |    | 300 | 450 | 450 | 450 | 450 | 450 |    |    |    |    |    |    |

TABLE 4

|  | -35 | -30 | -25 | -20 | -15 | -10 | -5 | 0 | 5 | 10 | 15 | 20 | 25 | 30 | 35 |
|---|---|---|---|---|---|---|---|---|---|---|---|---|---|---|---|
| 5 | 40 | 40 | 40 | 600 | 800 | 800 | 1250 | 1250 | 1250 | 800 | 800 | 600 | 40 | 40 | 40 |
| 0 | 50 | 50 | 50 | 600 | 800 | 800 | 1250 | 1250 | 1250 | 800 | 800 | 600 | 50 | 50 | 50 |
| -5 | 40 | 40 | 40 | 600 | 800 | 800 | 1250 | 1250 | 1250 | 800 | 800 | 600 | 40 | 40 | 40 |
| -10 |  |  |  | 600 | 800 | 800 | 1250 | 1250 | 1250 | 800 | 800 | 600 |  |  |  |
| -15 |  |  |  | 600 | 800 | 800 | 1250 | 1250 | 1250 | 800 | 800 | 600 |  |  |  |

As indicated above, these light intensity values can be used for creating the output light intensity distributions in the different operating modes. It is pointed out that above values and their angular separation, as shown in the Tables 1-4, may be independent from the number of LEDs. For example, it is possible that the source side light intensity distribution of one LED may be transformed by the associated optical system into an individual output light intensity distribution having an opening angle of 10° in both the horizontal and the vertical dimension. The light emitted by this LED may then contribute to the intensity values of four cells shown above. It is also possible that various LEDs jointly provide for the light intensity value shown above in one single cell. This may also be true if each of these LEDs only contributes to the light intensity value of one particular cell. In particular, different LEDs of different LED groups that are associated with different optical systems may result in respective individual output light intensity distributions that have their main light emission direction at the same horizontal and vertical angular values. In short, each of the above values may be generated by the light emitted by one or more LEDs, and each of the LEDs may contribute to one or more of above values. In a particular example, the optical systems are set up in such a way that the individual output light intensity distributions of each LED are narrow in opening angle and only contribute to one of the values given in the Tables. In this way, selecting the LEDs for achieving a particular output light intensity distribution for a particular operating mode does not require taking into account potentially complex interrelations between different LEDs for the resulting output light intensity distributions.

Table 5 shows an exemplary output light intensity distribution for a combined taxi and runway turn off light mode. As the aircraft is on the ground, all light is emitted within a small angle with respect to the horizontal plane, in particular within an angle of at most +/−5° with respect to the horizontal plane. In order to provide good illumination to the sides for potential sharp turns of the aircraft, the horizontal opening angle of the output light intensity distribution of the combined taxi and runway turn off light mode is 70°, which extends from −35° to +35°. The light intensity values are much lower than the maximum achievable light intensity values. On the ground, a reduced light intensity is sufficient for achieving good visibility, which is mainly due to the illuminated area being comparably close to the aircraft. In the present exemplary embodiment, the reduction as compared to the values of Table 4 is achieved by not switching on all LEDs that result in an output light intensity distribution in the given directions. Still, all LEDs that are switched on are run at their nominal light intensities.

TABLE 5

|  | -35 | -30 | -25 | -20 | -15 | -10 | -5 | 0 | 5 | 10 | 15 | 20 | 25 | 30 | 35 |
|---|---|---|---|---|---|---|---|---|---|---|---|---|---|---|---|
| 5 | 40 | 40 | 40 | 80 | 80 | 80 | 120 | 120 | 120 | 80 | 80 | 80 | 40 | 40 | 40 |
| 0 | 50 | 50 | 50 | 100 | 100 | 100 | 150 | 150 | 150 | 100 | 100 | 100 | 50 | 50 | 50 |
| -5 | 40 | 40 | 40 | 80 | 80 | 80 | 120 | 120 | 120 | 80 | 80 | 80 | 40 | 40 | 40 |
| -10 |  |  |  |  |  |  |  |  |  |  |  |  |  |  |  |
| -15 |  |  |  |  |  |  |  |  |  |  |  |  |  |  |  |

Table 6 shows an exemplary output light intensity distribution for one of a plurality of landing light modes. In the particular example, an output light intensity distribution for a situation with cross wind coming from the left is depicted. The cross wind requires the aircraft to have a yaw angle between 15° and 20° in the present example. In addition, the aircraft has a combined angle of attack and descent angle of between 10° and 15°. In order to account for this attitude of the aircraft, the output light emission distribution of the landing light operating mode in question has light intensity values of 600,000 to 800,000 cd at horizontal angles of 15° to 20° towards the right and at vertical angles of 10° to 15° towards the bottom. In this way, illumination of the landing target is ensured for the particular aircraft flight conditions.

TABLE 6

|  | -35 | -30 | -25 | -20 | -15 | -10 | -5 | 0 | 5 | 10 | 15 | 20 | 25 | 30 | 35 |
|---|---|---|---|---|---|---|---|---|---|---|---|---|---|---|---|
| 5 |  |  |  |  |  |  |  |  |  |  |  |  |  |  |  |
| 0 |  |  |  |  |  |  |  |  |  |  |  |  |  |  |  |
| -5 |  |  |  |  |  |  |  |  |  |  |  |  |  |  |  |
| -10 |  |  |  |  |  |  |  |  |  |  |  | 800 | 600 |  |  |
| -15 |  |  |  |  |  |  |  |  |  |  |  | 800 | 600 |  |  |

Figure 5A:
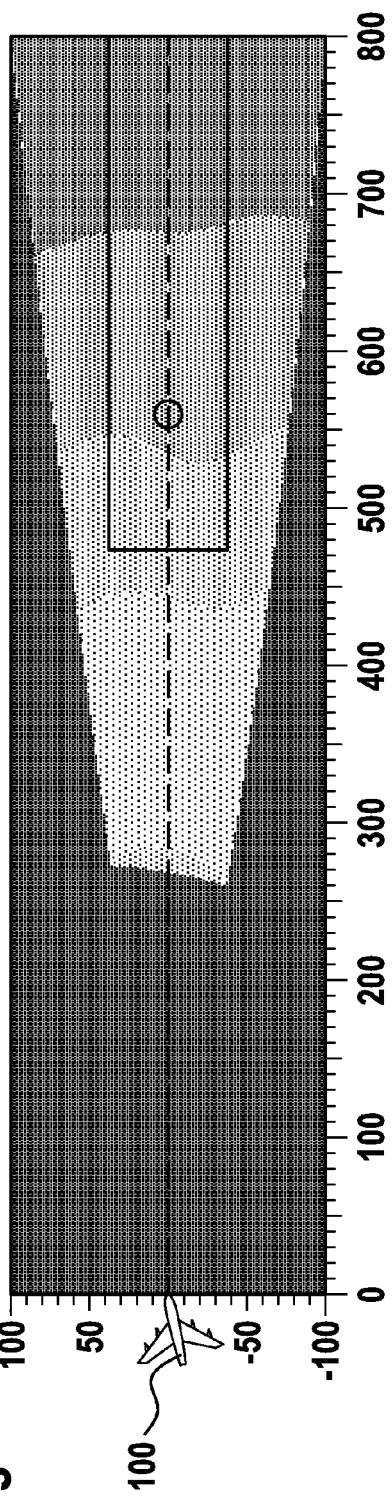
FIG. 5A and FIG. 5B, collectively referred to as FIG. 5 shows an exemplary illumination of a runway during a descent of an aircraft, equipped with a dynamic aircraft headlight in accordance with an exemplary embodiment of the invention, in comparison with a descent of an aircraft in a prior art approach.
Figure 5B:
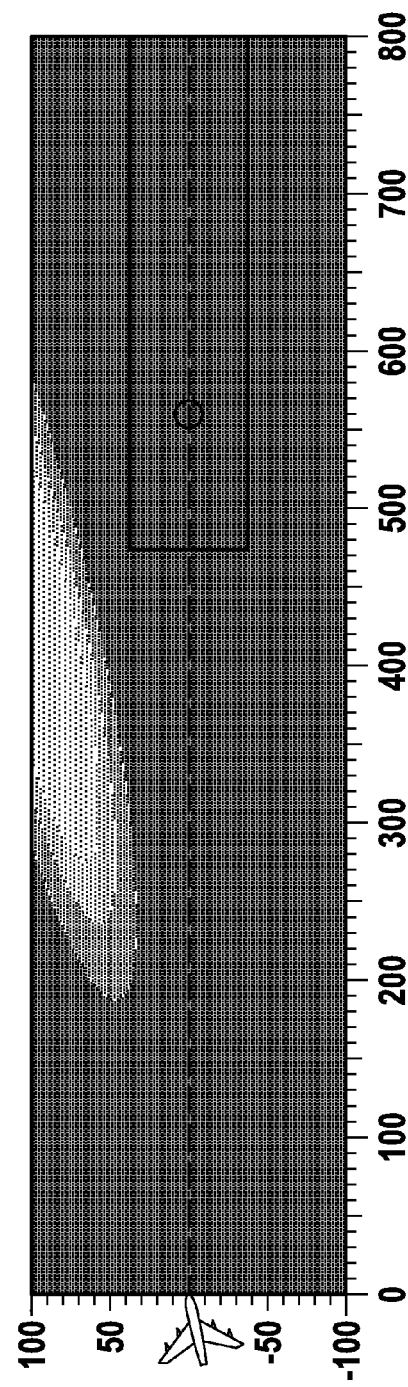

This selection of the appropriate operating mode is illustrated in FIG. 5. FIG. 5A illustrates in a top view that the landing runway can be well illuminated with the dynamic aircraft headlight(s) in accordance with exemplary embodiments of the invention despite the yaw angle being very significant, namely somewhere between 15° and 20°. In contrast, FIG. 5B shows a prior art approach where the yaw angle of the aircraft resulted in the headlight's output beam being far off the landing target.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A dynamic aircraft headlight, comprising:
an LED group, comprising a plurality of LEDs, and
an optical system, comprising at least one optical element, the optical system being associated with the LED group for shaping an output light intensity distribution from the light emitted by the LED group,
wherein the LED group and the optical system are stationary within the dynamic aircraft light unit, with each LED of the LED group having a set position with respect to the optical system and with a light output of each LED being affected differently by the optical system,
wherein each LED of the LED group is individually controllable,
wherein the dynamic aircraft headlight is configured to be operated in a plurality of operating modes, with a respective selected subset of the plurality of LEDs being switched on in each of the plurality of operating modes and with a different output light intensity distribution being emitted by the dynamic aircraft headlight in each of the plurality of operating modes,
wherein the plurality of operating modes comprises a plurality of landing light modes, wherein the output light emission distribution of each of the plurality of landing light modes has a respective main light emission direction and wherein the plurality of landing light modes have different respective main light emission directions, and
wherein the dynamic aircraft headlight is configured to select one of the landing light modes based on an aircraft yaw angle and an aircraft pitch angle and a descent angle.

2. The dynamic aircraft headlight according to claim 1, wherein less than one of 60%, 50%, or 40%, of the plurality of LEDs are switched on in each of the plurality of operating modes.

3. The dynamic aircraft headlight according to claim 1, wherein the respective selected subset of the plurality of LEDs in operation emit a respective source side light intensity distribution that is an optical image of a desired output light intensity distribution for the selected operating mode.

4. The dynamic aircraft headlight according to claim 1, wherein the plurality of LEDs of the LED group are arranged in one of a two-dimensional LED array and a linear LED row.

5. The dynamic aircraft headlight according to claim 4, further comprising:
a plurality of LED groups and a plurality of optical systems, wherein each LED group of the plurality of LED groups is associated with one of the plurality of optical systems for shaping a respective output light intensity distribution from the light emitted by the respective LED group.

6. The dynamic aircraft headlight according to claim 1, wherein the plurality of operating modes comprise at least two of a landing light mode, a take-off light mode, a taxi light mode, and a runway turn off light mode.

7. The dynamic aircraft headlight according to claim 6, wherein the dynamic aircraft headlight is configured to select one of the operating modes based on command data received from a manual switch and/or to select one of the operating modes based on flight condition data received from aircraft operation sensors, such as a ground roll sensor, and/or from an aircraft board computer.

8. The dynamic aircraft headlight according to claim 1, wherein the dynamic aircraft headlight is configured to select one of the landing light modes based on at least one of an aircraft height and an aircraft distance to a landing target in addition to the aircraft yaw angle, the aircraft pitch angle and the descent angle.

9. The dynamic aircraft headlight according to claim 8, wherein the dynamic aircraft headlight comprises at least one sensor configured to sense at least one of the aircraft yaw angle, the aircraft pitch angle, the descent angle, the aircraft height, and the aircraft distance to the landing target, or
wherein the dynamic aircraft headlight is configured to receive at least one of the aircraft yaw angle, the aircraft pitch angle, the descent angle, the aircraft height, and the aircraft distance to the landing target from aircraft operation sensors and/or from an aircraft board computer.

10. The dynamic aircraft headlight according to claim 9, wherein the dynamic aircraft headlight is configured to select one of the landing light modes such that the main light emission direction of the selected one of the landing light modes is the main light emission direction of the plurality of main light emission directions of the plurality of landing light modes that points closest to the landing target.

11. The dynamic aircraft headlight according to claim 10, wherein the output light emission distribution of each of the plurality of landing light modes has an opening angle of less than 15° around the respective main light emission direction.

12. The dynamic aircraft headlight according to claim 10, wherein the output light emission distribution of each of the plurality of landing light modes has an opening angle between 5° and 10° around the respective main light emission direction.

13. The dynamic aircraft headlight according to claim 1, wherein the output light emission distributions of all operating modes have a combined horizontal opening angle of one of: between 30° and 60°, between 35° and 45°, or a combined vertical opening angle of between 10° and 30° or between 15° and 25°.

14. A set of dynamic aircraft headlights, comprising:
a central dynamic aircraft headlight in accordance with claim 1, configured to be mounted to a front running gear of an aircraft,
a right dynamic aircraft headlight in accordance with any one of the preceding claims, configured to be mounted to a right wing structure of an aircraft, and
a left dynamic aircraft headlight in accordance with any one of the preceding claims, configured to be mounted to a left wing structure of an aircraft.

15. The dynamic aircraft headlight according to claim 1, wherein the dynamic aircraft headlight comprises at least one sensor configured to sense at least one of the aircraft yaw angle, the aircraft pitch angle, and the descent angle, or wherein the dynamic aircraft headlight is configured to receive at least one of the aircraft yaw angle, the aircraft pitch angle, and the descent angle from aircraft operation sensors and/or from an aircraft board computer.

16. The dynamic aircraft headlight according to claim 1, wherein the dynamic aircraft headlight is configured to select one of the landing light modes such that the main light emission direction of the selected one of the landing light modes is the main light emission direction of the plurality of main light emission directions of the plurality of landing light modes that points closest to the landing target.

17. The dynamic aircraft headlight according to claim 1, wherein the output light emission distribution of each of the plurality of landing light modes has an opening angle of less than 15° around the respective main light emission direction.

18. The dynamic aircraft headlight according to claim 1, wherein the output light emission distribution of each of the plurality of landing light modes has an opening angle between 5° and 10° around the respective main light emission direction.

19. Method of operating a dynamic aircraft headlight, the dynamic aircraft headlight comprising an LED group, comprising a plurality of LEDs, and an optical system, comprising at least one optical element, the optical system being associated with the LED group for shaping an output light intensity distribution from the light emitted by the LED group, wherein the LED group and the optical system are stationary within the dynamic aircraft light unit, with each LED of the LED group having a set position with respect to the optical system and with a light output of each LED being affected differently by the optical system, and wherein each LED of the LED group is individually controllable, the method comprising the steps of:

at least one of receiving command data from a manual switch and receiving flight condition data from one of aircraft operation sensors and an aircraft board computer;

based on the at least one of command data and flight condition data, selecting one of a plurality of operating modes of the dynamic aircraft headlight, with each operating mode having a different output light emission distribution and with the plurality of operating modes comprising a plurality of landing light modes, wherein the output light emission distribution of each of the plurality of landing light modes has a respective main light emission direction and wherein the plurality of landing light modes have different respective main light emission directions, wherein the selecting of one of the landing light modes is based on an aircraft yaw angle and an aircraft pitch angle and a descent angle; and based on the selected one of the plurality of operating modes, switching a respective selected subset of the plurality of LEDs on, resulting in a particular output light emission distribution associated with the selected one of the plurality of operating modes.

\* \* \* \* \*